United States Patent [19]
Gustafsson et al.

[11] Patent Number: 5,394,756
[45] Date of Patent: Mar. 7, 1995

[54] THREE-DIMENSIONAL MAGNETOELASTIC FORCE TRANSDUCER

[75] Inventors: Pär Gustafsson; Jan O. Nordvall; Lars Örnholmer, all of Västerås, Sweden

[73] Assignee: Asea Brown Boveri AB, Västerås, Sweden

[21] Appl. No.: 51,876

[22] Filed: Apr. 26, 1993

[30] Foreign Application Priority Data

May 5, 1992 [SE] Sweden ............... 9201403

[51] Int. Cl.6 .................................. G01L 1/12
[52] U.S. Cl. ................................. 73/862.69
[58] Field of Search .......... 73/862.69, DIG. 2, 779; 324/209; 336/20

[56] References Cited

U.S. PATENT DOCUMENTS

| | | | |
|---|---|---|---|
| 3,184,963 | 5/1965 | Dahle | 73/362.69 X |
| 3,379,053 | 4/1968 | Berglund et al. | 73/779 |
| 3,681,982 | 8/1972 | Hiratsuka et al. | 73/DIG. 2 X |
| 3,717,039 | 2/1973 | Zinker | 73/DIG. 2 X |
| 3,861,203 | 1/1975 | Dahle et al. | 73/DIG. 2 X |
| 4,193,294 | 3/1980 | Forslund et al. | 73/862.69 |
| 4,675,615 | 6/1987 | Bramanti | 73/DIG. 2 X |
| 4,802,368 | 2/1989 | Nordvali | 73/862.69 |
| 4,823,621 | 4/1989 | Sobel et al. | 73/862.69 |
| 4,825,709 | 5/1989 | Nordvall | 73/862.69 |

FOREIGN PATENT DOCUMENTS 151267 8/1955 Sweden.

*Primary Examiner*—Richard E. Chilcot, Jr.
*Assistant Examiner*—Elizabeth L. Dougherty
*Attorney, Agent, or Firm*—Watson, Cole, Grindle & Watson

[57] ABSTRACT

A puck for a three-dimensional magnetoelastic force transducer, with a cylindrically-shaped body having a circular cross-section, a semi-spherically-shaped first end surface and a second end surface having an annular flange with an outer diameter corresponding to the diameter of the circular cross section of the body; the body comprising a substantially solid magnetoelastic material with a center axis extending between the middle of the first and second bottom surfaces; the body having at least three force-measuring zones equidistantly spaced from the center axis and symmetrically distributed within the body; each of the at least three force-measuring zones having respective holes for receiving excitation and measuring windings; and force transmission paths extending between the intersection of the center axis and the first end surface, the intersection forming a point of application of force to the force transducer, and each of the at least three force-measuring zones to the annular flange.

6 Claims, 1 Drawing Sheet

THREE-DIMENSIONAL MAGNETOELASTIC FORCE TRANSDUCER

TECHNICAL FIELD

In certain applications force-resistant force transducers for very high forces are needed, which should have small dimensions for mounting in restricted spaces or existing constructions. The present invention is a solution whichfulfils these requirements.

BACKGROUND ART, THE PROBLEM

Magnetoelastic force transducers designed in different ways more or less adapted to different measuring purposes are previously known from a plurality of patent specifications. SE-B-151 267 describes such a transducer which comprises a force-subjected magnetic core built up of magnetoelastic sheets and provided with four through-holes for two windings located perpendicular to each other. One of these is an excitation winding which is supplied from an a.c. source for generating a magnetic flux in the core, the other being a measuring winding for sensing the magnitude of the magnetic flux passing through the measuring winding. The principle of measurement is based on the property of magnetic material which means that, when the material is subjected to a mechanical stress, then the permeability is changed in the direction of the stress. The magnitude of the flux which passes through the measuring winding in this way will then depend on the magnitude of the external force applied to the core.

A magnetoelastic transducer with a solid core is described in U.S. Pat. No. 4,802,368. The transducer consists of two identical cylindrical bodies which are held together with the aid of a stud bolt. In an axially and concentrically inner space, there is placed a bobbin with two measuring windings connected in opposition and an excitation winding supplied with alternating current. The interior of the transducer is designed such that, opposite to the respective measuring winding in each of the bodies, a thin cylindrical tubular wall is formed. When the transducer is affected, via the stud bolt, by an externally applied force, a compressive stress arises in one of these tubular walls and a tensile stress in the other. This affects the magnetic conditions such that a signal is obtained from the measuring windings which is proportional to the applied force.

SE-B-300 062 describes a magnetoelastic transducer which is preferably intended to be placed in a circular recess in the magnetostrictive material perpendicular to the direction of stress. The transducer has a cylindrical shape and is provided with a magnetization device connected to an a.c. source as well as a sensing device connected to a measuring device. Both the magnetization device and the sensing device consist of an iron core with a winding applied thereon and the iron cores are each arranged in respective axial planes in the transducer, the two axial planes making an angle of either 90 or 60 degrees with each other.

In certain applications, special requirements are made on the design of the force transducer and on its properties in other respects. These requirements may, for example, be that the force transducer should be insensitive to non-desired forces in the form of lateral loads and to torques. When such requirements have been made, attempts have been made to avoid the problems by enclosing the transducer in load cell housings. These load cell housings often have built-in membrane packages which are weak in the direction of the measuring force but stiff in other directions. This means that only the measuring force is introduced into the transducer. This solution, however, leads to an increased overall height.

As mentioned under the TECHNICAL FIELD, a magnetoelastic transducer according to the invention constitutes a solution to a problem-ridden field where there is a need for a force transducer for very high forces, where lateral loads may occur and where the available space is restricted and, to a certain extent, determined by a special application. Examples of this are hydroelectric generating sets, that is, turbines and generators. These normally have vertically standing shafts with a diameter which may be between 0.6 and 2.0 m. For taking up the vertical force generated by the rotating part, the shaft is provided with a flange resting against a supporting bearing. The shaft is often provided with a guide bearing consisting of a number of bearing segments placed around the periphery of the shaft. To give the bearing segments a certain mobility, these segments are provided, in the centre of the outwardly-facing surface, with a recess for relatively small circular-cylindrical solid bodies—called "studs" within this technical field—which make contact with the surrounding ring or bearing housing of the guide bearing. The studs often have a diameter of 40–60 mm and an axial length of 30–50 mm. One of the circular end surfaces, which faces the bearing segments, is formed such that the contact with the segments consist of an annular, plane surface with an outer diameter corresponding to the diameter of the end surface. The contact of the other circular end surface of the stud with the bearing housing largely occurs within a small region around the centre of the end surface. This is achieved by making this end surface slightly curved in a direction from the periphery and towards the centre.

From several points of view it would be desirable to be able to measure, with force measuring devices, the radial forces arising on the bearing segments of the guide bearing. The problem which arises in that connection is that the force measuring devices must not entail any change of the existing guide bearing constructions.

An example of another application for measurement of compressive force which requires a low overall height is the weighing of containers. It is often desired to mount a load cell into the legs of an already existing container. Since the construction from the beginning did not take into consideration the accomodation of load cells, the space for these are usually minimal.

Other applications of this embodiment of transducers relate to the measurement of tensile force. This transducer can also be used in connection with wire drawing. It is then desired to control the force in the wire to optimize the process while at the same time avoiding, for example, wire breakage.

SUMMARY OF THE INVENTION

The invention comprises using the existing stud as a measuring body and forming it with measuring zones adapted for magnetoelastic measurement of the forces which the stud is to transmit. A stud thus formed will be referred to in the following as a "puck", by which is meant a magnetoelastic force transducer comprising a body of solid magnetoelastic material with measuring zones and with excitation windings which are to be supplied with alternating current and with measuring windings for sensing the forces to which the magnetoelastic force transducer is subjected.

The design of the puck with introduction of force from the bearing segments to the annular surface on one of the circular end surfaces of the puck, and with transmission of force to the bearing housing via the central parts of the other, outwardly-facing, slightly curved circular end surface of the puck means that the principal stress trajectories arising when a load is applied will, at least in a region half-way between the two end surfaces, substantially extend along straight, inclined paths the inclination of which is, in principle, parallel to a conceived line between the annular plane surface of one of the end surfaces and the central parts of the curved end surface. The excitation and measuring windings are to be placed in relation to the principal stress trajectories in such a way that the relationship between measuring load and disturbing loads becomes optimal, and therefore the inclination of the principal stress trajectories is determining for the location of the holes for the excitation and measuring windings. The holes are then placed preferably half-way between the two end surfaces. Calculations of how the principal stress trajectories extend show that they have a relatively long straight, inclined central part which is deflected towards the two end surfaces such that the trajectories can be said to have a truncated S-shape between the two end surfaces.

As the pressure areas of the two end surfaces are displaced in relation to each other, the distance from the measuring zone to the pressure area increases. This means a reduced dependence on the planeness of the base.

The classic magnetoelastic force transducer according to the above-mentioned SE-B-151 257 is, in principle, a two-dimensional force transducer with force planes parallel to the magnetoelastic sheets included in the sheet package. Such a construction exhibits an undesirable influence from lateral forces and, for thinner transducers, also an instability across the sheet package. The traditional way of increasing the resistance to lateral load is to build the transducer into a load cell housing which, with the aid of a membrane, takes up lateral forces but not the forces to be measured. By providing the puck with at least three measuring zones equidistant from the axis of the puck and symmetrically distributed around the puck, a three-dimensional force transducer is obtained. This means that the design of the transducer has an inherent stiffness and insensitivity to lateral forces. This means that a transducer is obtained which does not need a separate load cell housing with built-in membranes for taking up lateral forces.

In a preferred embodiment the load cell is provided with four measuring zones with the angle 90° between the central force planes. The measuring zones of the puck are formed by removing, in some way, such a quantity of the stud material from the cylindrical surface of the solid stud and inwards that only the measuring zones remain. Then the holes for the excitation and measuring windings are bored in the measuring zones, these windings being rotated relative to the direction of the principal stress trajectories, as mentioned above.

DESCRIPTION OF THE PREFERRED EMBODIMENTS

Figure 1:
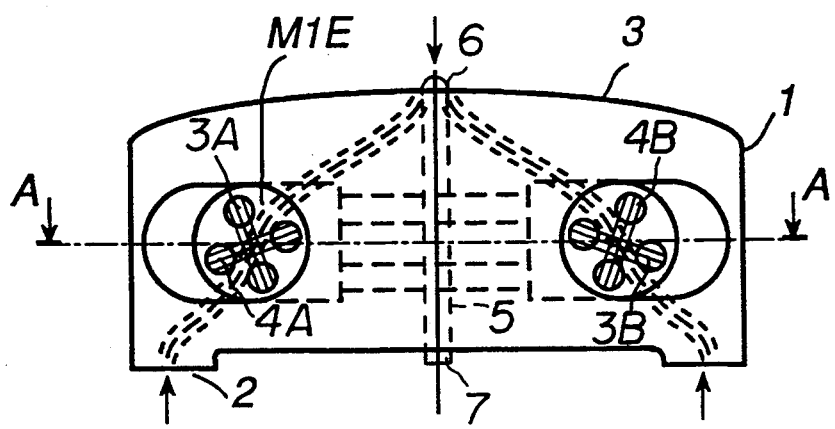
FIG. 1 shows a preferred embodiment of the puck according to the invention, as seen from the side.
Figure 2:
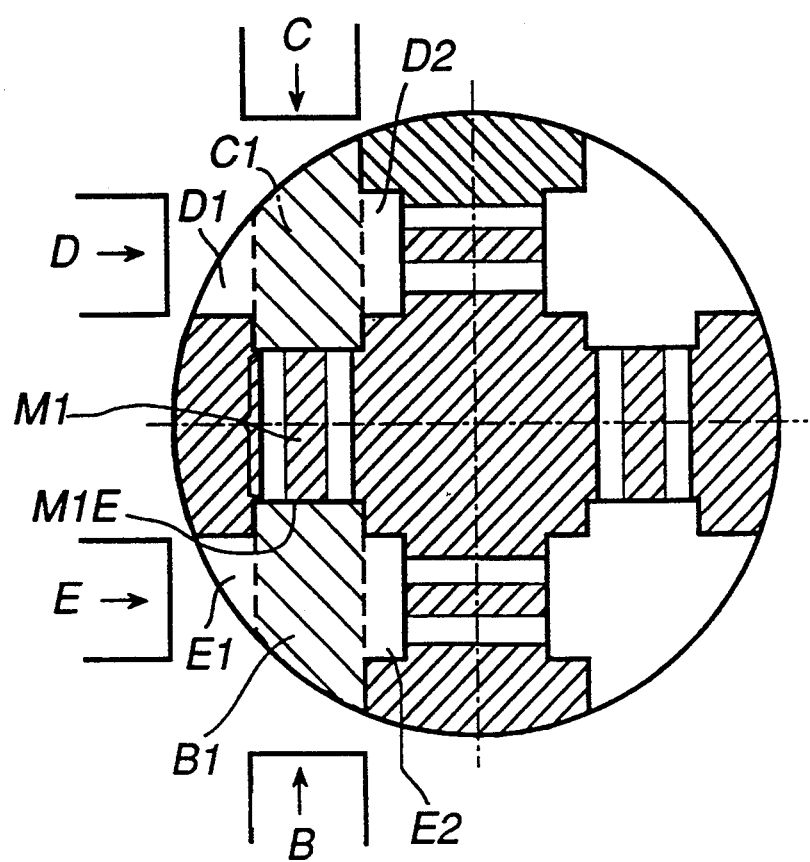
FIG. 2 shows a section in the preferred embodiment of the puck, parallel to and half-way between the two end surfaces of the puck.

FIG. 1 shows the puck 1 in a preferred embodiment with four measuring zones seen from the side. The annular end surface is shown at 2. The opposite end surface 3 is slightly upwardly-curved as shown in the figure, the force transmission to the bearing housing taking place within the central parts of the curved end surface. To describe in the simplest way how the measuring zones are formed, reference is made to FIG. 2 which shows a section through the puck at A—A in FIG. 1. By means of cylindrically cutting tools B and C, centred in the same plane A—A, the volume which in plane A—A corresponds to the dashed surfaces B1 and C1 is cut away from the cylindrical surface. That part of the material of the puck which remains between the cut-away parts forms a first measuring zone M1. The cylindrically cutting tools D and E are then used to cut away the parts D1 and D2 as well as E1 and E2.

Corresponding cuts are then made on the opposite side of the puck, thus forming the other three measuring zones. One end surface M1E of the measuring zone M1 is also shown in FIG. 1 together with the corresponding cuts. By means of this embodiment, a protected space for the winding coils is also created, i.e., excitation coils 3A, 3B and measuring coils 4A, 4B as shown in FIG. 1.

Instead of one end surface being slightly outwardly-curved with force transmission via the central part of the end surface, it may be suitable in certain applications for the end surface to be plane with a centrally located sphere.

For tensile force applications the puck may be provided with a central through-hole 5 into which a tension pin 6 may be inserted, which has a flange 7 making contact with the other circular end surface. The tensile force connection then takes place against the other end of the pin.

In connection with wire drawing, a nozzle may be mounted in the hole, through which the wire is drawn.

The dashed lines shown in FIG. 1 largely correspond to the principal stress trajectories in a diametrical plane in the middle of two measuring zones. This also determines the location of the holes and the inclination thereof relative to the principal stress trajectories.

In other embodiments (not shown) the puck may generally be provided with at least three measuring zones, as mentioned under the SUMMARY OF THE INVENTION, placed equidistantly from the axis of the puck and symmetrically distributed around the puck.

We claim:

1. A puck for a three-dimensional magnetoelastic force transducer, comprising:
   a cylindrically-shaped body having a circular cross-section, a semi-spherically-shaped first end surface and a second end surface having an annular flange with an outer diameter corresponding to the diameter of said circular cross section of said body;
   said body comprising a substantially solid magnetoelastic material with a center axis extending between the middle of said first and second end surfaces;
   said body having at least three force-measuring zones equidistantly spaced from said center axis and symmetrically distributed within said body;
   each of said at least three force-measuring zones having respective holes for receiving excitation and measuring windings; and force transmission paths extending between the intersection of said center axis and said first end surface, said intersection forming a point of application of force to the force transducer, and through each of said at least three force-measuring zones to said annular flange.

2. The puck according to claim 1, wherein each of said at least three force-measuring zones is formed in a plane half-way between said first and second end surfaces.

3. The puck according to claim 1, wherein said at least three force-measuring zones is four force-measuring zones.

4. The puck according to claim 1, wherein said first end surface is formed as a curved convex surface from centered about said point.

5. The puck according to claim 1, wherein said body has a hole centered about said point and extending between said first and second end surfaces, and further comprising a tension pin having a flange and extending from said first end surface through said hole with said flange engaging said second end surface.

6. The puck according to claim 1, wherein said body has a hole centered about said point and extending between said first and second end surfaces for mounting a nozzle therein.

* * * * *